United States Patent
O'Donnell

(10) Patent No.: US 11,103,332 B2
(45) Date of Patent: Aug. 31, 2021

(54) LOW-PROFILE RETENTIVE ABUTMENT

(71) Applicants: Thomas J. O'Donnell, Webster, NY (US); Rochester Technical Group, Inc., Rochester, NY (US)

(72) Inventor: Thomas J. O'Donnell, Webster, NY (US)

(*) Notice: Subject to any disclaimer, the term of this patent is extended or adjusted under 35 U.S.C. 154(b) by 174 days.

(21) Appl. No.: 16/432,571

(22) Filed: Jun. 5, 2019

(65) Prior Publication Data
US 2019/0365511 A1 Dec. 5, 2019

Related U.S. Application Data

(60) Provisional application No. 62/680,953, filed on Jun. 5, 2018.

(51) Int. Cl.
*A61C 8/00* (2006.01)

(52) U.S. Cl.
CPC .......... *A61C 8/0095* (2013.01); *A61C 8/0062* (2013.01); *A61C 8/0068* (2013.01); *A61C 8/0069* (2013.01)

(58) Field of Classification Search
CPC ... A61C 8/0048; A61C 8/0062; A61C 8/0063; A61C 8/0068; A61C 8/0069; A61C 8/0095; A61C 13/0001; A61C 13/0027; A61C 13/2656; A61C 13/267
See application file for complete search history.

(56) References Cited

U.S. PATENT DOCUMENTS

| | | | | |
|---|---|---|---|---|
| 1,577,831 | A * | 3/1926 | Luks | A61C 13/267 433/178 |
| 5,556,280 | A * | 9/1996 | Pelak | A61C 8/0048 433/172 |
| 2004/0005530 | A1* | 1/2004 | Mullaly | A61C 13/2656 433/172 |
| 2004/0053194 | A1 | 3/2004 | Carroll | |
| 2013/0004916 | A1 | 1/2013 | Bellanca et al. | |
| 2015/0335401 | A1* | 11/2015 | Robichaud | A61C 13/26 433/173 |
| 2019/0321141 | A1* | 10/2019 | Storni | A61C 8/0048 |

OTHER PUBLICATIONS

"Prosthetic phase _constructing the implant dentures" https://www.infodentis.com/dental-implants/prosthetic-phase.php.

* cited by examiner

*Primary Examiner* — Edward Moran

(57) ABSTRACT

A low-profile retentive abutment is used for securing dentures to a user's jaw. The low-profile abutment has an abutment fastener is used to mount an overdenture onto the user's jaw and has a body, a dimpled recession, and a retentive clasp. The dimple recession traverses into the body and forms a mounting point to attach the clasp to the body. The clasp is a connector that enables the overdenture to be detachably mounted onto the body. The clasp has a stop plate, a C-shaped frame, and a dimple protrusion. The stop plate ensures that the clasp is maintained in a desired orientation while attached to the body. The frame is connected in between the stop plate and the dimple protrusion so that the dimple protrusion engages into the dimple recession. Accordingly, the frame facilitates maintaining the clasp in an orientation that facilitates securely attaching the overdenture to the user's jaw.

7 Claims, 8 Drawing Sheets

LOW-PROFILE RETENTIVE ABUTMENT

The current application claims a priority to the U.S. Provisional Patent application Ser. No. 62/680,953 filed on Jun. 5, 2018.

FIELD OF THE INVENTION

The present invention relates generally to denture systems. More specifically, the present invention is a retentive abutment and framework for an implant-supported denture. The present invention utilizes a unique fastening mechanism in order to retain and reinforce the denture while maximizing the vertical clearance for efficient installation and restoration of the denture.

BACKGROUND OF THE INVENTION

According to American Association of Oral and Maxillofacial Surgeons, approximately 70% of adults with ages of 35 to 44 have lost at least one permanent tooth due to an accident, gum disease, a failed root canal or tooth decay. Furthermore, by age 74, about 1 in 4 of adults have lost all their permanent teeth. For decades, removable dentures for fully edentulous patients and fixed bridgework or partial dentures for partially edentulous patients were standard options for these patients to restore their ability to eat, speak clearly and smile. However, dental implants have recently become more popular due to their unique features such as providing better functionality, long-term reliability, and more natural look. Unlike removable dentures that rely only on suction and fixed bridges that are cemented to the remaining teeth, the dental implants usually are fused (or "implanted") into the jawbone under the gum tissue through an osseointegration process. The natural looking, artificial teeth with an abutment and framework are then attached to these implants made of metal such as titanium, which is readily accepted by a patient's body. The normal fixed implant dentures use four to six implants per jaw to secure the denture with screws. The implants are mostly concealed by gums, but usually there is a structural bar or framework that attaches to the abutments with screws or cement and goes over the surface of gums to help support and attach the denture. Because they are fastened into the implants that are fused into the jawbone, the denture positioned on top generally won't dislodge by the force of chewing or other jaw movements. Sitting on gums, however, it is possible for food and bacteria to get underneath the denture to cause discomfort and a situation where maintaining proper hygiene is impossible. Other methods of retaining dentures on implants involve the use of an abutment and attachment with a denture that can be removed for hygiene. Some common examples are Locator, Ball, Ceka, Hader, Dolder, ERA, and Dalbo attachments, over time and because of divergent angles the implant dentures may not fit the attachment properly, becoming loose over time causing damage or discomfort to the user. Thus, restoration, maintenance, or cleaning is necessary. With most implant dentures, the vertical clearance between the crest of ridge to incisal edge of prosthesis is limited, thus the denture restoration is difficult.

An objective of the present invention is to provide a reliable abutment and framework system that allows a traditional partial denture concept with clasps to engage custom abutments specifically designed for retention, and to securely retain and support a denture or partial denture on two or four custom implant abutments. The abutments are custom designed to fit within the confines of an existing denture configuration and the available space for the retentive framework imbedded in the denture. The abutments comprise a taper and a dimple engaging the clasp in the framework to retain and reinforce the denture. The abutment and the retentive framework system secures the denture on two or four properly spaced implant abutments, the stability achieved is similar to a fixed hybrid "All-On-4" implant prosthesis, the advantage being it can be removed for proper hygiene, unlike a fixed denture. When compared to the attachment-based approach the retentive abutment and the retentive framework system provides better support with the ability to adjust retention and minimize vertical forces on the tissue without using traditional attachments that require periodic replacement and complicated pick up procedures. The denture can be created with significantly less vertical dimension due to the low profile of the abutment than appliances used in traditional overdentures. Thus, the abutment offers more efficient restorative procedures and the ability to offer implant retained dentures to patients who were previously poor candidates. The abutment also comprises a metal vertical stop surface which enables the retentive frame to oppose occlusal and vertical forces. Additionally, the abutment comprises a greater wraparound than 180 degrees which prevents the frame from rotating. The framework is designed to support the denture teeth and acrylic to prevent fracture. Unlike a normal fixed implant attachment that needs periodic replacement, the clasps engaging the abutment dimples in this invention can be adjusted to increase or decrease retention without replacement.

DETAIL DESCRIPTIONS OF THE INVENTION

Figure 1:
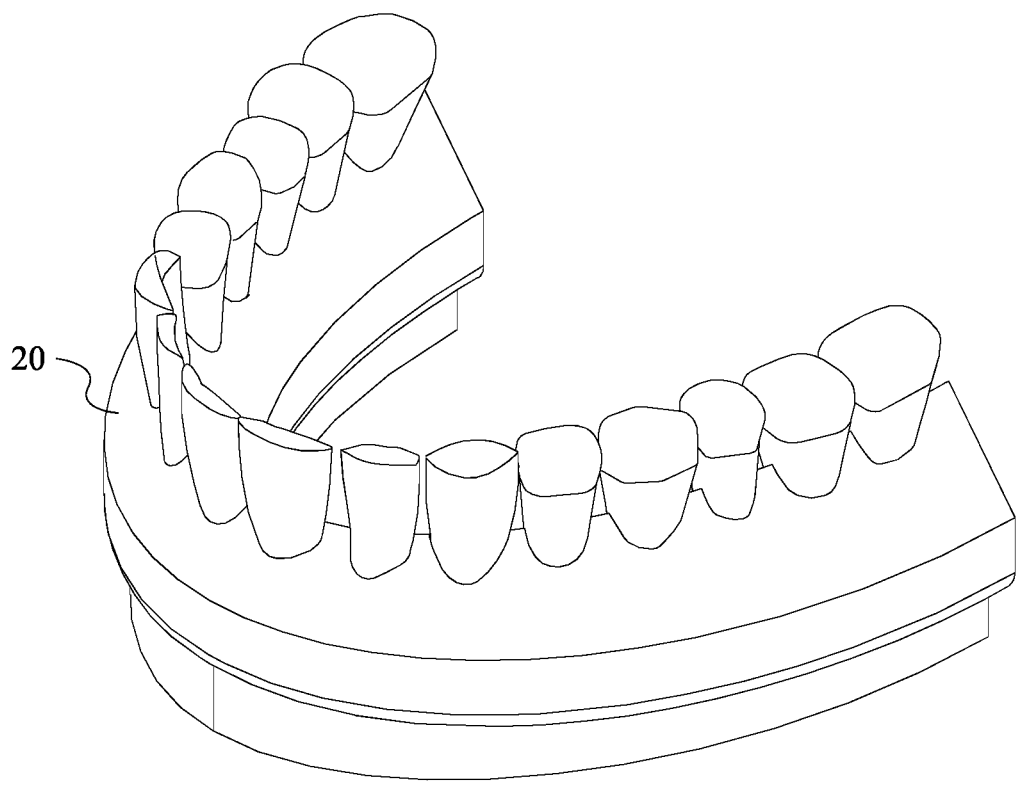
FIG. 1 is a perspective view of the present invention.

The present invention generally relates to denture systems. More specifically, the present invention is a retentive abutment and framework system that provides secure and reliable support for traditional full or partial dentures. Additionally, the present invention utilizes a clasp-type fastening mechanism to attach dentures to the gum of the user that provide an easy means of removing the dentures for cleaning and maintenance purposes.

Referring to FIG. 1 through FIG. 8, in the simplest embodiment, the present invention comprises an implant overdenture 20 and an at least one abutment fastener 1. The abutment fastener 1 mounts the implant overdenture 20 to the jawbone. A single instance of the abutment fastener 1 is described for simplicity purposes; for a secure attachment the at least one abutment fastener 1 is implemented as a plurality of abutment fasteners 1. The implant overdenture 20 is a removable dental prosthetic that covers and rests on the gums and or remaining natural teeth. The abutment fastener 1 comprises an abutment body 2, a dimple recession 7, and a retentive clasp 8. In general, the abutment fastener 1 comprises two interlocking elements; the abutment body 2 and the dimple recession 7 act as a first interlocking element; and, the retentive clasp 8 acts as a second interlocking element. The abutment body 2 is the structural element that interlocks with and supports a specific point of the implant overdenture 20. The abutment body 2 is a semi-rectangular prism and comprises a top surface 3, a bottom surface 4, and a lateral surface 5. A bottom end of the abutment body 2 is integrated into the jawline, under the gum tissue. The abutment body 2 is integrated/attached to the jawbone through standard dental procedures, such procedures as osseointegration. A top end of the abutment body 2 is attached to/within the implant overdenture 20. Specifically, the top end of the abutment body 2 is attached to the implant overdenture 20 through the dimple recession 7 and the retentive clasp 8. The retentive clasp 8 is integrated into the implant overdenture 20 while the dimple recession 7 is a semi-circular cavity which laterally and normally traverses into the lateral surface 5. The dimple recession 7 receives and interlocks with the retentive clasp 8 to attach the abutment body 2 to the implant overdenture 20.

Referring to FIG. 1 through FIG. 8, the retentive clasp 8 comprises a vertical stop plate 9, a C-shaped frame 10, and a dimple protrusion 13. The vertical stop plate 9 is a metal disk that is positioned parallel and adjacent to the top surface 3 of the abutment body 2. The vertical stop plate 9 opposes and reduces occlusal and vertical forces. Additionally, the vertical stop plate 9 is shaped and sized to compliment the top surface 3 of the abutment body 2. To ensure a low profile for the abutment fastener 1, the top surface 3 of the abutment body 2 is a flow surface. The C-shaped frame 10 is an elongated strip of metal designed to radially stabilize the connection between the retentive clasp 8 and the abutment body 2. Specifically, the C-shaped frame 10 wraps around the abutment body 2 and prevents relative rotational motion in between the abutment body 2 and the implant overdenture 20. Specifically, the C-shaped frame 10 is positioned parallel and offset to the vertical stop plate 9. A fixed end 11 of the C-shaped frame 10 is mounted to the vertical stop plate 9. The C-shaped frame 10 is positioned adjacent and along the lateral surface 5 of the abutment body 2, thus wrapping around the abutment body 2; a wraparound greater than 180 degrees is preferred. A free end 12 of the C-shaped frame 10 is connected to the dimple protrusion 13; specifically, the dimple protrusion 13 is terminally connected to the free end 12. The dimple protrusion 13 is a semi-spherical structure that is shaped and sized complimentary to the dimple recession 7. The dimple protrusion 13 is positioned within the dimple recession 7 to securely attach the retentive clasp 8 to the abutment body 2. The interlocking design between the retentive clasp 8 and the abutment body 2 allows for a dentist to easily increase or decrease retention without the need of periodic replacement.

Referring to FIG. 5 through FIG. 8, in the preferred embodiment of the present invention, the retentive clasp 8 preferably further comprises a vertical offset band 14 that is used to mount the C-shaped frame 10 to the vertical stop plate 9. Specifically, the vertical offset band 14 is strip of metal that is positioned adjacent and perpendicular to the vertical stop plate 9. Additionally, the vertical stop plate 9 is terminally connected to the vertical offset band 14 on a first end of the vertical offset band 14. On a second end of the vertical offset band 14, the fixed end 11 of the C-shaped frame 10 is terminally connected to the vertical offset band 14, opposite the vertical stop plate 9. The length of the vertical offset band 14 denotes the engagement area on the lateral surface 5 in between the dimple recession 7 and the dimple protrusion 13. The vertical offset band 14 may also be used to reduce the relative radial translation in between the retentive clasp 8 and the abutment body 2. For this, the retentive clasp 8 further comprises a vertical groove 15. The vertical groove 15 is a channel sized and positioned to complimentary receive the vertical offset band 14. Resultantly, vertical groove 15 and the vertical offset band 14 radially lock the retentive clasp 8 with the abutment body 2. Specifically, the vertical groove 15 is positioned opposite the dimple recession 7, across the abutment body 2, in order to have two points of engagement for the retentive clasp 8. To receive the vertical offset band 14, the vertical groove 15 is oriented perpendicular to the top surface 3 and is normally traverses into the abutment body 2 from the lateral surface 5. In alternative embodiments of the present invention, a multitude of instance of the vertical offset band 14 may be used for additional structural support. The length, width, thickness, and material composition of the vertical offset band 14 is subject to change to meet the need and preferences of the implant overdenture 20.

Figure 7:
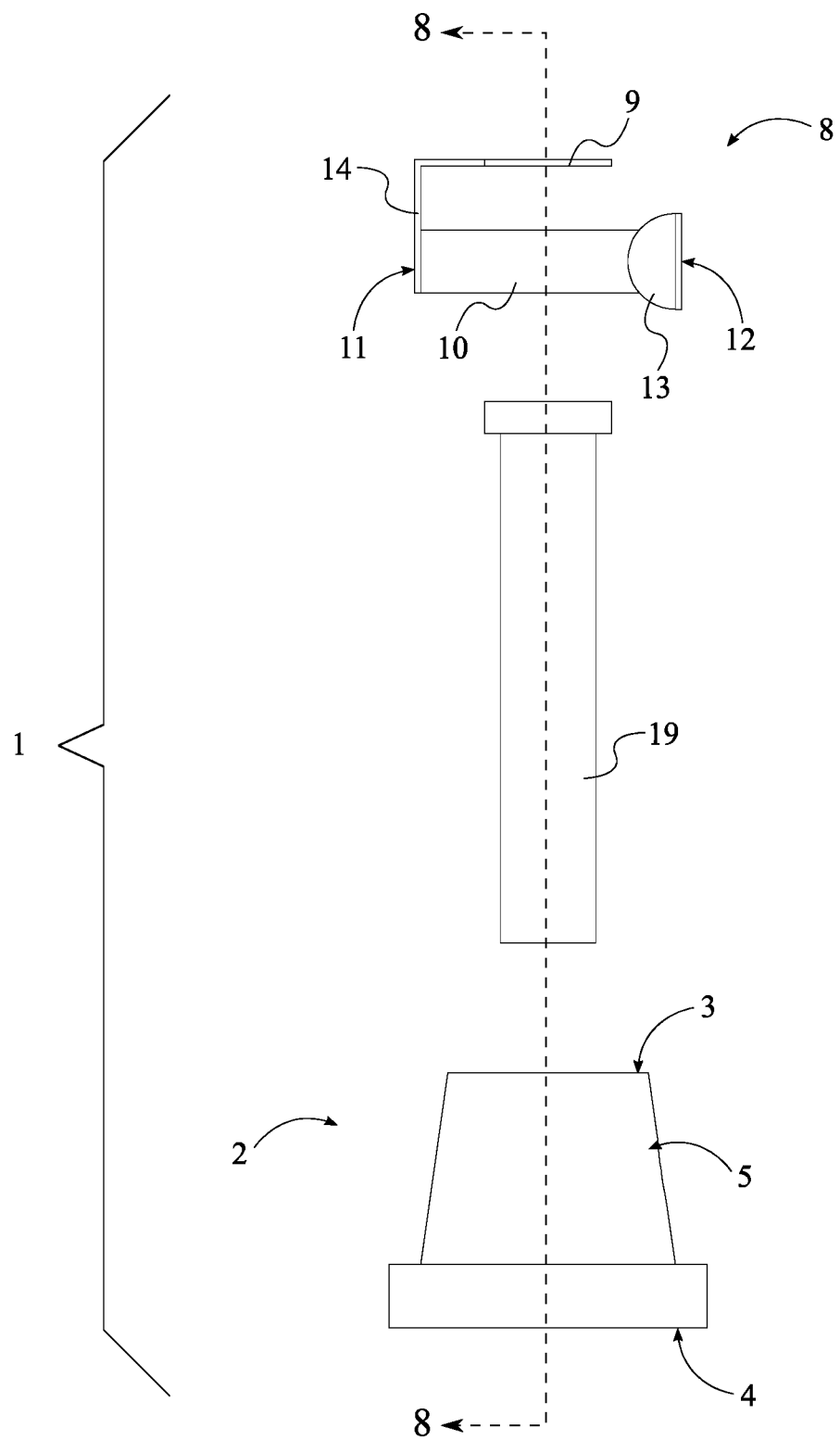
FIG. 7 is an exploded front-plan view of the abutment fastener used in the present invention.
Figure 8:
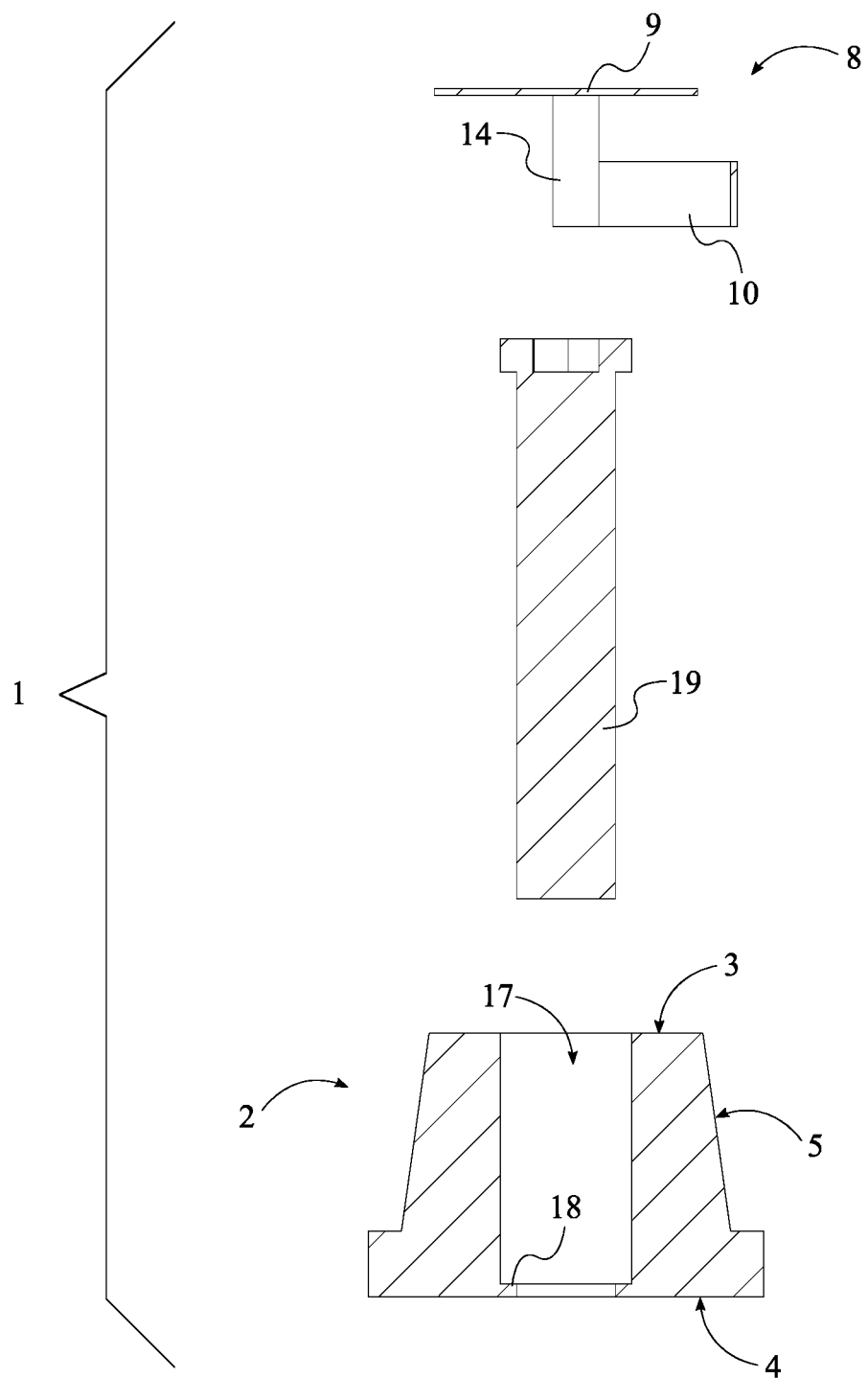
FIG. 8 is a left-side sectional view of the present invention taken along line 8-8 in FIG. 7.

Referring to FIG. 7 and FIG. 8, the abutment fastener 1 further comprises a screw-receiving hole 17, an annular flange 18, and a dental implant screw 19 that anchor the abutment body 2 to the jawbone, similar to traditional methods and means. The dental implant screw 19 is a surgical screw that is bonded to the jawbone through osseointegration to support the abutment body 2. The screw-receiving hole 17 and the annular flange 18 receive and interlock with the dental implant screw 19. The screw-receiving hole 17 is sized to the shank size of the dental implant screw 19 and normally traverses through the abutment body 2 from the top surface 3 of the abutment body 2 to the bottom surface 4 of the abutment body 2. The annular flange 18 acts as a stop for the dental implant screw 19 and, thus, is positioned within the screw-receiving hole 17, adjacent to the bottom surface 4 of the abutment body 2. Additionally, the annular flange 18 is laterally connected to the abutment body 2. To secure the abutment body 2 to the jawbone, the dental implant screw 19 is positioned within the screw-receiving hole 17 and is screwed into the bone until the dental implant screw 19 firmly presses against the annular flange 18.

Referring to FIG. 1 through FIG. 4, the implant overdenture 20 comprises a denture base 21, a gum-receiving recess 22, and an implant framework 23. The denture base 21 is any standard denture used in dentistry field; specifically, the denture base 21 is a plate or frame with a set of teeth, similar to traditional dentures. The gum-receiving recess 22 receives the gums and is a U-shaped cavity that is molded complimentary to the gums. The implant framework 23 is internally integrated within and along the denture base 21 and acts as the structural support for the implant overdenture 20 as well as the abutment fastener 1. For this, the implant framework 23 supports and is connected to the retentive clasp 8. For this, the retentive clasp 8 further comprises an abutment-receiving cavity 16. The abutment-receiving cavity 16 receives the abutment body 2 such that the denture base 21 sits flush with the gums. Specifically, the abutment-receiving cavity 16 is positioned within the gum-receiving recess 22 and traverses into the denture base 21. The vertical stop plate 9 is positioned within the abutment-receiving cavity 16 with the C-shaped frame 10 being oriented away from the denture base 21 and the implant framework 23. Additionally, the vertical stop plate 9 is integrated into the implant framework 23 such that abutment fastener 1 is securely connected within the implant overdenture 20.

Figure 2:
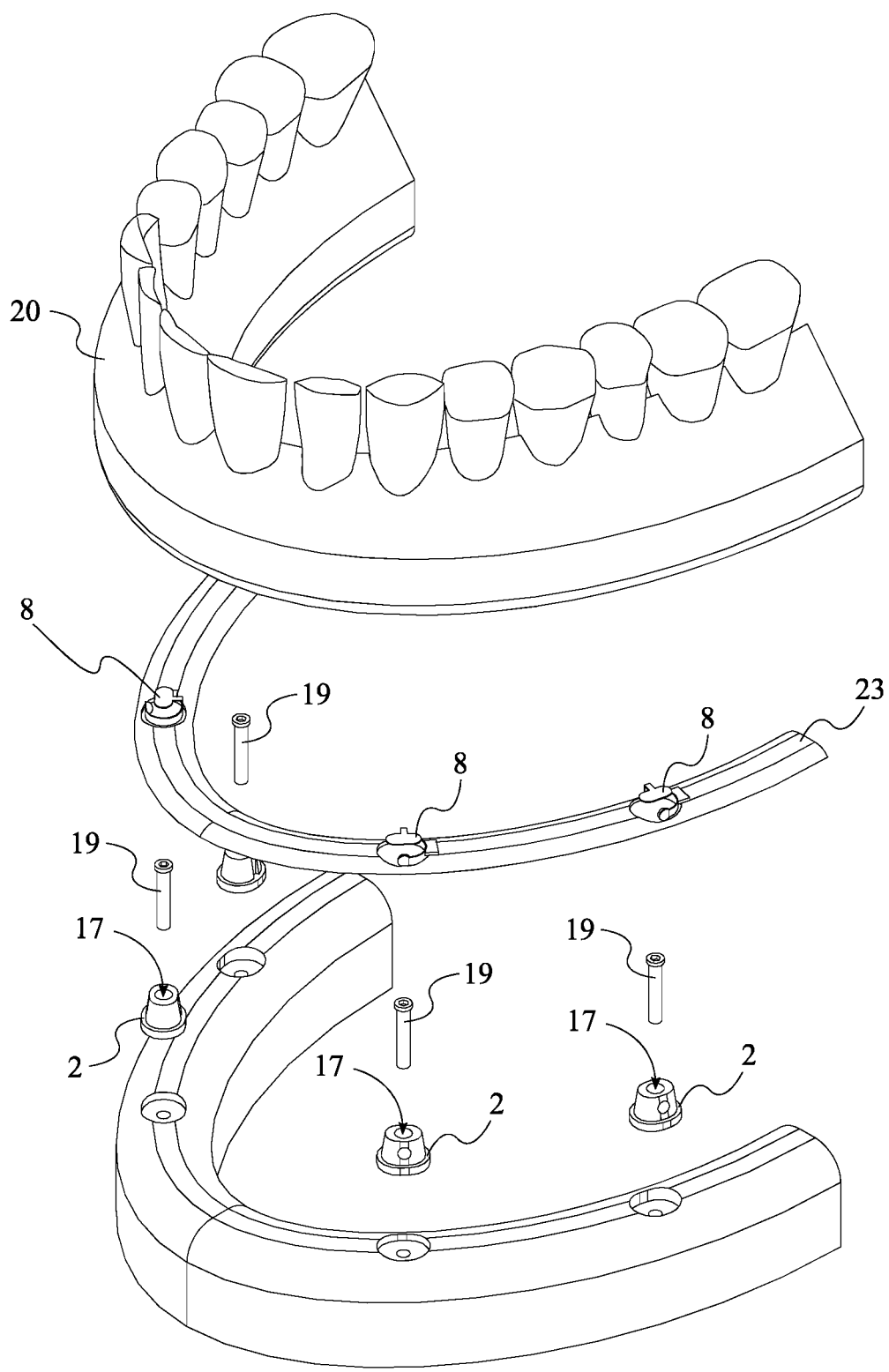
FIG. 2 is an exploded front-top-right perspective view of the present invention.

Referring to FIG. 2, the present invention is designed to be used with more than one instance of the abutment fastener 1. In the preferred embodiment, the plurality of abutment fasteners 1 is used to adequately secure the implant overdenture 20 to the gums. Specifically, the plurality of abutment fasteners 1 is distributed along the gum-receiving recess 22 with each of the plurality of abutment fasteners 1 being integrated into the implant overdenture 20. This ensures that there are multiple fastening points all along the implant overdenture 20 and reduces the chances of the implant overdenture 20 dislodging from the gums over time and during extensive use.

Figure 3:
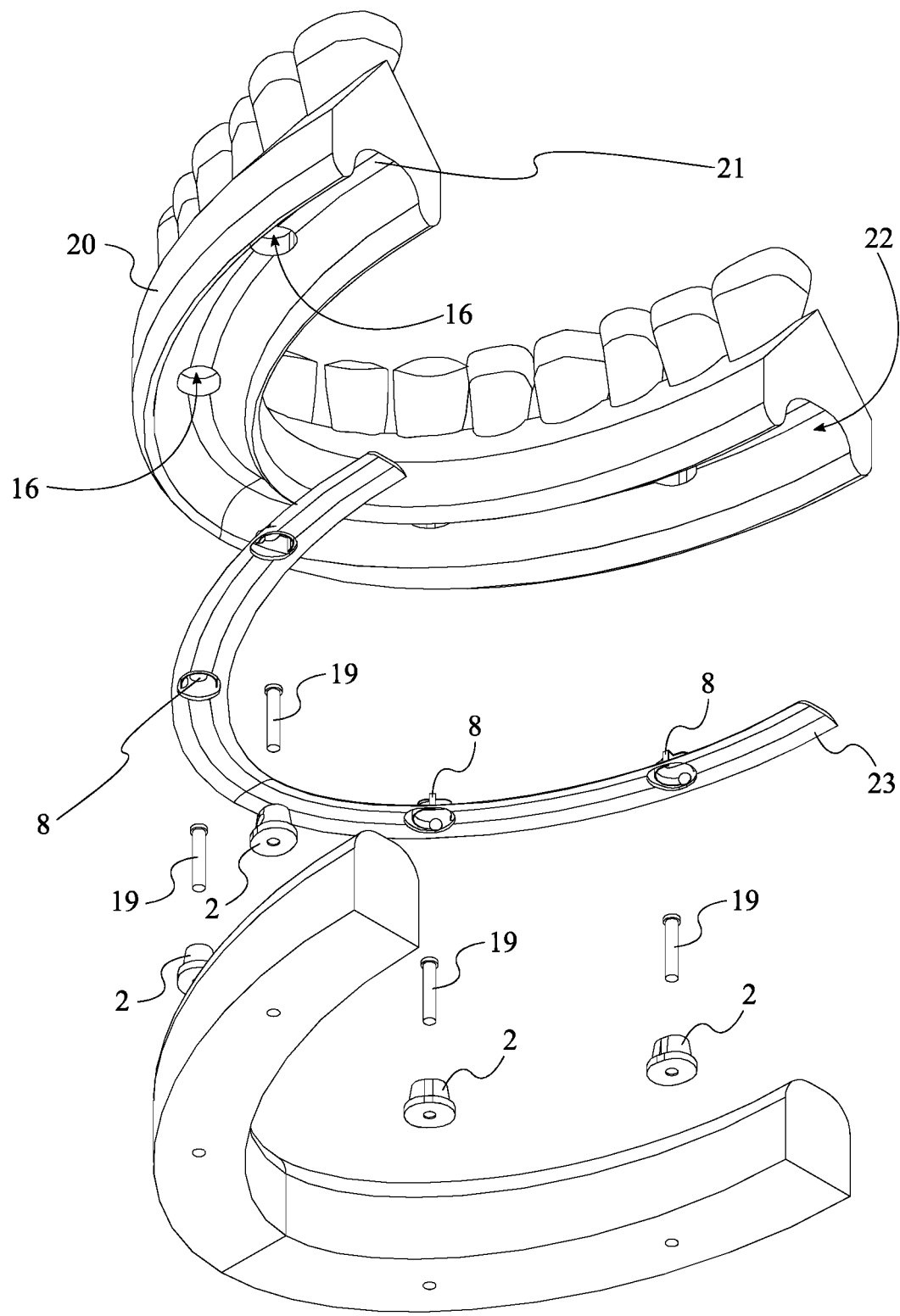
FIG. 3 is an exploded back-bottom-right perspective view of the present invention.
Figure 4:
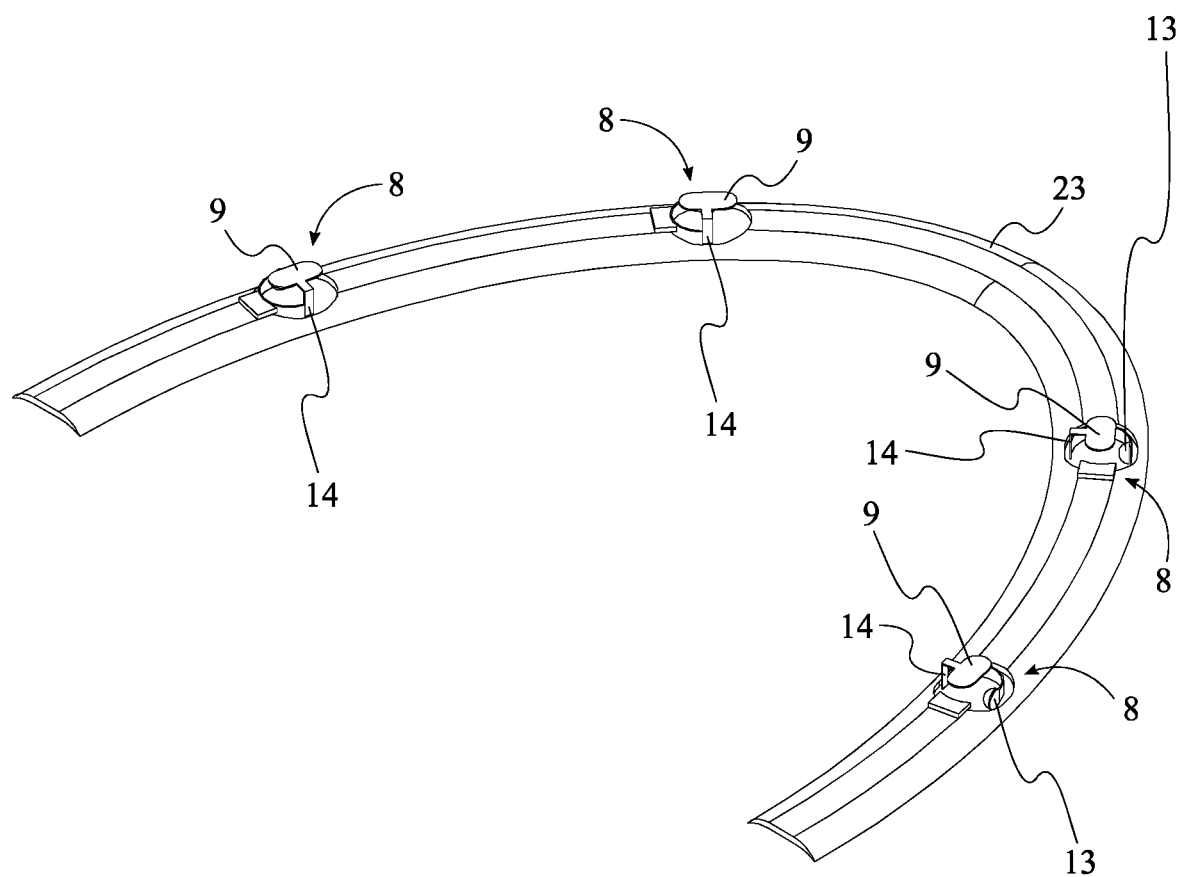
FIG. 4 is a perspective view of the implant framework used in the present invention.
Figure 5:
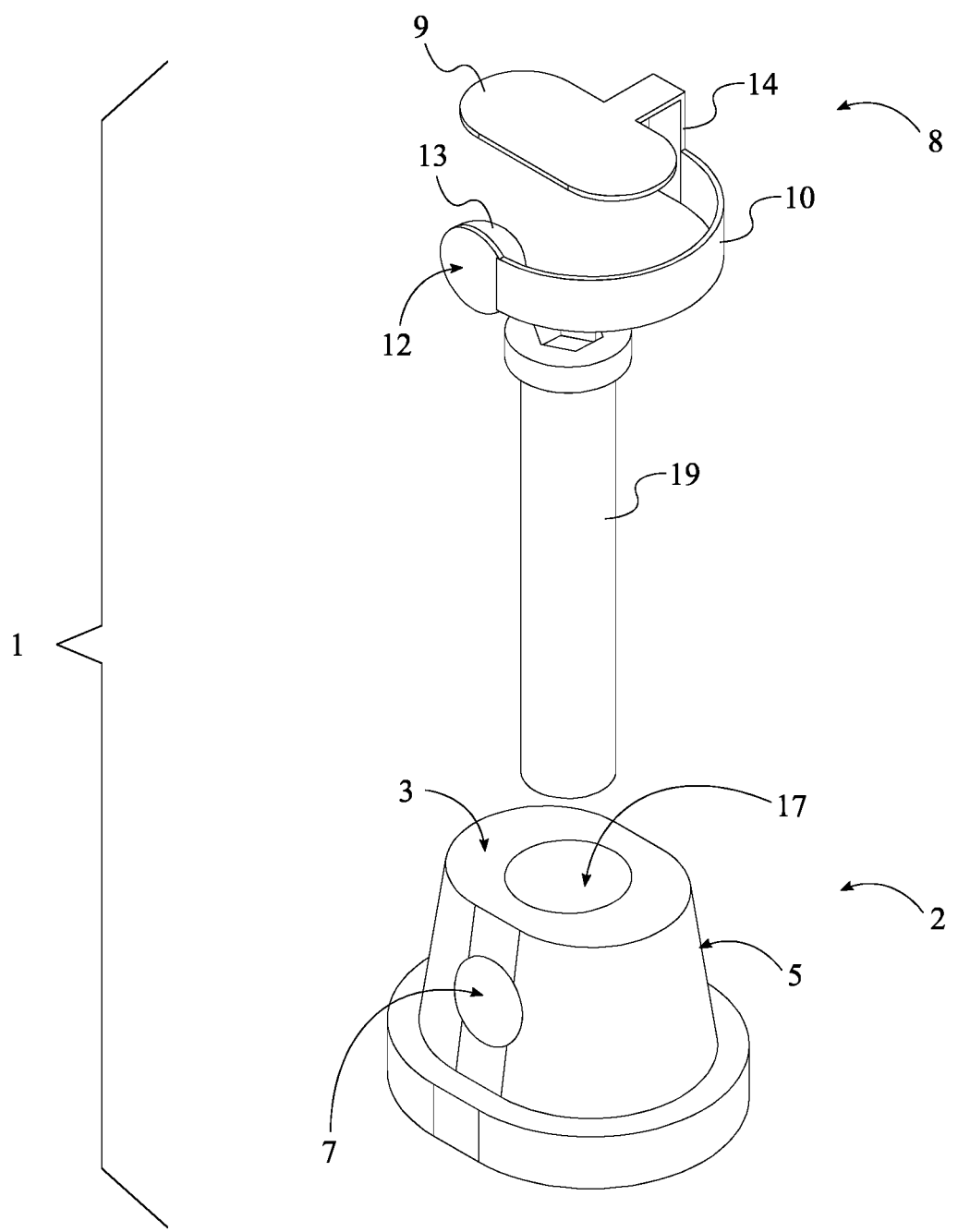
FIG. 5 is an exploded front-top-right perspective view of the abutment fastener used in the present invention.
Figure 6:
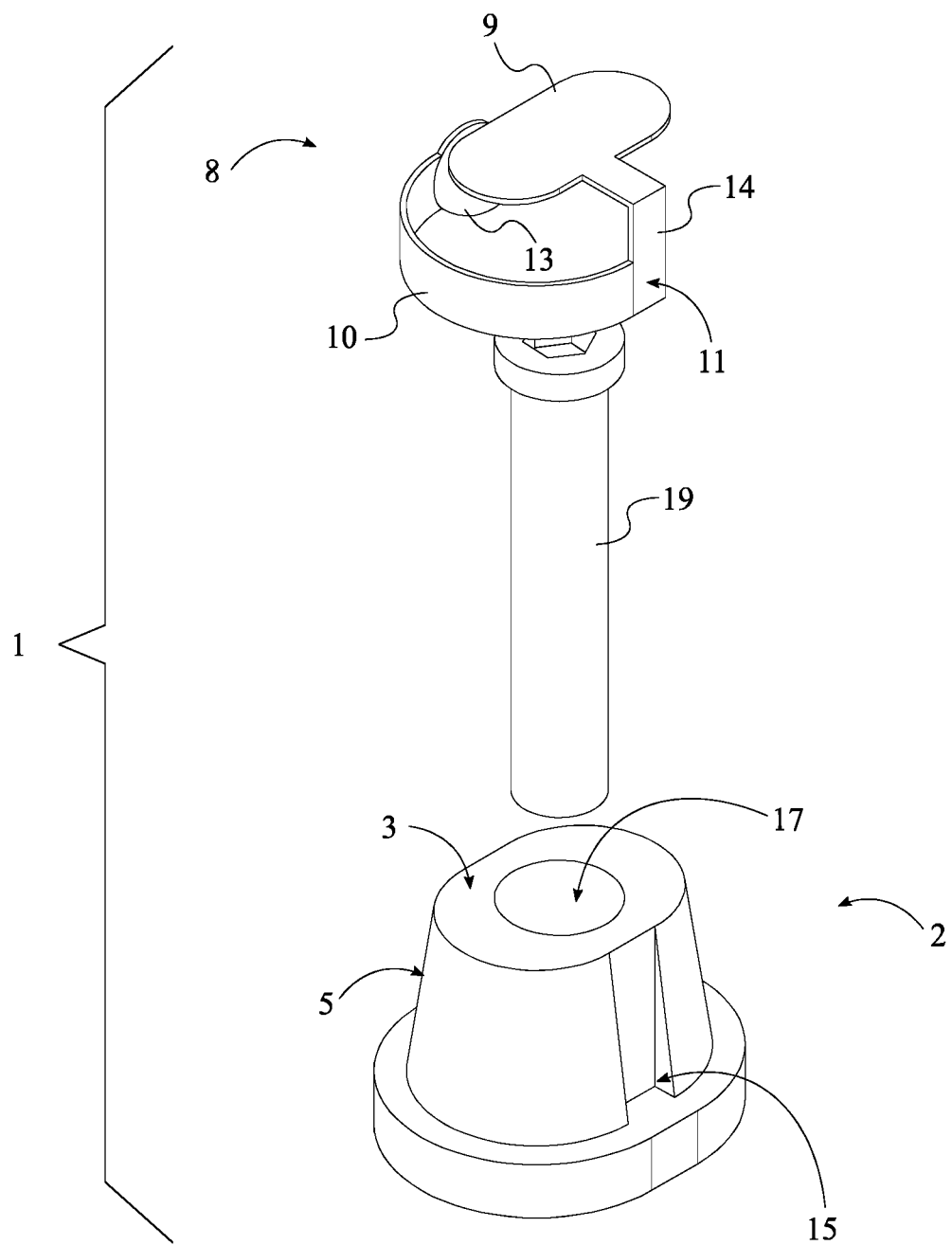
FIG. 6 is an exploded back-bottom-right perspective view of the abutment fastener used in the present invention.

Referring to FIG. 3 and FIG. 7, the abutment body 2 is designed for easy installation and with minimum stress points. To aid the dentist during installation of the implant abutment, the abutment body 2 tapers from the bottom surface 4 to the top surface 3 at an about 8 degrees angle, although different degrees of tapering may also be utilized. Resultingly, the abutment body 2 towards the top surface 3 has a larger clearance in regards to the abutment-receiving cavity 16, allowing a larger margin of error during installation. Furthermore, in the preferred embodiment of the present invention, a cross-section 6 of the abutment body 2 is a rectangular profile with rounded corner. The rectangular profile reduces the chances of relative radial movement while the rounded corners limit the number of possible high stress points on the abutment body 2. Thus, reducing the chances of structural failure such as cracking and warping during extreme uses of the present invention.

Although the invention has been explained in relation to its preferred embodiment, it is to be understood that many other possible modifications and variations can be made without departing from the spirit and scope of the invention as hereinafter claimed.

What is claimed is:

1. A low-profile retentive abutment system comprising:
at least one abutment fastener;
the abutment fastener comprising an abutment body, a dimple recession, and a retentive clasp;
the abutment body comprising a top surface, a bottom surface, and a lateral surface;
the retentive clasp comprises a vertical stop plate, a C-shaped frame, and a dimple protrusion;
the abutment body tapering from the bottom surface to the top surface;
the dimple recession laterally and normally traversing into the lateral surface;
the C-shaped frame being indirectly positioned offset to the vertical stop plate;
a fixed end of the C-shaped frame being mounted to the vertical stop plate;
the dimple protrusion being terminally connected to a free end of the C-shaped frame;
the vertical stop plate being positioned parallel and adjacent to the top surface of the abutment body;
the C-shaped frame being positioned adjacent and along the lateral surface of the abutment body;
the dimple protrusion being positioned within the dimple recession;
the retentive clasp further comprising a vertical offset band;
the abutment body further comprising a vertical groove;
the vertical offset band being positioned adjacent and perpendicular to the vertical stop plate;
the vertical stop plate being terminally connected to the vertical offset band;
the fixed end of the C-shaped frame being terminally connected to the vertical offset band, opposite the vertical stop plate;
the vertical groove being positioned opposite the dimple recession, across the abutment body;
the vertical groove being oriented perpendicular to the top surface;
the vertical groove normally traversing into the abutment body from the lateral surface; and
the vertical offset band being positioned within the vertical groove.

2. The low-profile retentive abutment system as claimed in claim 1 comprising:
the abutment fastener further comprising a screw-receiving hole, an annular flange, and a dental implant screw;
the screw-receiving hole normally traversing through the abutment body from the top surface of the abutment body to the bottom surface of the abutment body;
the annular flange being positioned within the screw-receiving hole, adjacent to the bottom surface of the abutment body;
the annular flange being laterally connected to the abutment body;
the dental implant screw being positioned within the screw-receiving hole;
the dental implant screw being pressed against the annular flange.

3. The low-profile retentive abutment system as claimed in claim 1, wherein the top surface of the abutment body is a flat surface.

4. The low-profile retentive abutment system as claimed in claim 1 comprising:
an implant overdenture;
the implant overdenture comprising an abutment-receiving cavity, a denture base, a gum-receiving recess, and an implant framework;
the implant framework being internally integrated within and along the denture base;
the abutment-receiving cavity being positioned within the gum-receiving recess;
the abutment-receiving cavity traversing into the denture base;
the vertical stop plate being positioned within the abutment-receiving cavity.

5. The low-profile retentive abutment system as claimed in claim 4 comprising:
the at least one abutment fastener being a plurality of abutment fasteners;
the plurality of abutment fasteners being distributed along the gum-receiving recess.

6. The low-profile retentive abutment system as claimed in claim 1, wherein the abutment body tapers from the bottom surface to the top surface at an about 8 degree angle.

7. The low-profile retentive abutment system as claimed in claim 1, wherein a cross-section of the abutment body is a rectangular profile.

* * * * *